United States Patent [19]
Cruz

[11] Patent Number: 5,887,538
[45] Date of Patent: Mar. 30, 1999

[54] SAILBOARD FOR A WIND POWERED SAILING APPARATUS

[76] Inventor: Mark Cruz, P.O. Box 91, Caldwell, N.J. 07006

[21] Appl. No.: 863,979

[22] Filed: May 27, 1997

[51] Int. Cl.⁶ .................................................. B63B 35/79
[52] U.S. Cl. ..................... 114/39.2; 114/274; 114/279; 441/79
[58] Field of Search ................... 441/65, 74, 79, 441/75; 114/39.2, 274, 127, 271, 129, 279, 132, 280, 140, 141, 143

[56] References Cited

U.S. PATENT DOCUMENTS

| | | | |
|---|---|---|---|
| 3,455,261 | 7/1969 | Perrin | 114/39.2 |
| 3,599,259 | 8/1971 | Shewmon | 441/79 |
| 3,747,138 | 7/1973 | Morgan | 441/79 |
| 4,194,458 | 3/1980 | Messing | 114/39.2 |
| 4,923,427 | 5/1990 | Roland | 441/79 |
| 5,152,705 | 10/1992 | Rock | 441/79 |

*Primary Examiner*—Stephen Avila
*Attorney, Agent, or Firm*—Bernard Murphy

[57] ABSTRACT

The novel sailboard is arcuate about its longitudinal and transverse axes, and has blading fore and aft for supporting the sailboard upon a frozen surface. The front blading is carried on a pivotal plate which has spring loading and damping, and the rear blading comprises pluralities of blades of varying height and attitude relative to the longitudinal axis.

8 Claims, 3 Drawing Sheets

5,887,538

SAILBOARD FOR A WIND POWERED SAILING APPARATUS

FIELD OF THE INVENTION

This invention pertains to sailboards, for wind powered, sailing apparatus, such as the following. Disclosed in U.S. Pat. No. 3,982,766, issued to James D. Budge on Sep. 28, 1976, is a Wind Propelled Skateboard. Disclosed in U.S. Pat. No. 4,094,262, is an Icecraft issued to Tilo Riedel on Jun. 13, 1978. Disclosed in U.S. Pat. No. 3,831,539 is a Wind Propelled Apparatus issued to Robert Black on Aug. 27, 1974.

The sailboards and apparatuses shown in the aforesaid patents are commendable, and suitable for the objects of the inventors. However, they lack means to facilitate any practical steering. What has been needed in this technology is a sailboard, that the user stands upon, specifically designed to use existing wind surf sails and skills, and which is particularly crafted and formed as to enable the user to dramatically effect steering and control of the board simply by altering his or her weight distribution on the sailboard.

SUMMARY OF THE INVENTION

It is an object of this invention to set forth such a needed sailboard, for a wind powered sailing apparatus usable on frozen lakes, snow, as well as on paved surfaces or any, like, firm bearing surface. In each circumstance, the sailboard has means coupled thereto for supporting it, in elevation, upon a firm, bearing surface, such as a frozen surface or paved surface. In the former, the supporting means, of course comprises blades, and in the latter, the supporting means comprises rollers.

Particularly, it is an object of this invention to disclose a sailboard for a wind powered sailing apparatus, comprising a board; and means coupled to said board, for supporting said board, in elevation, upon a firm bearing surface; wherein said board has a longitudinal axis; and said board is arcuately formed about said axis. Also, it is an object of this invention to disclose a sailboard which also has a transverse axis, and is also arcuately formed about the transverse axis.

Further objects of this invention, as well as the novel features thereof, will become apparent by the reference to the following description, taken in conjunction with the accompanying figures, in which:

DETAILED DESCRIPTION OF THE INVENTION

Figure 1:
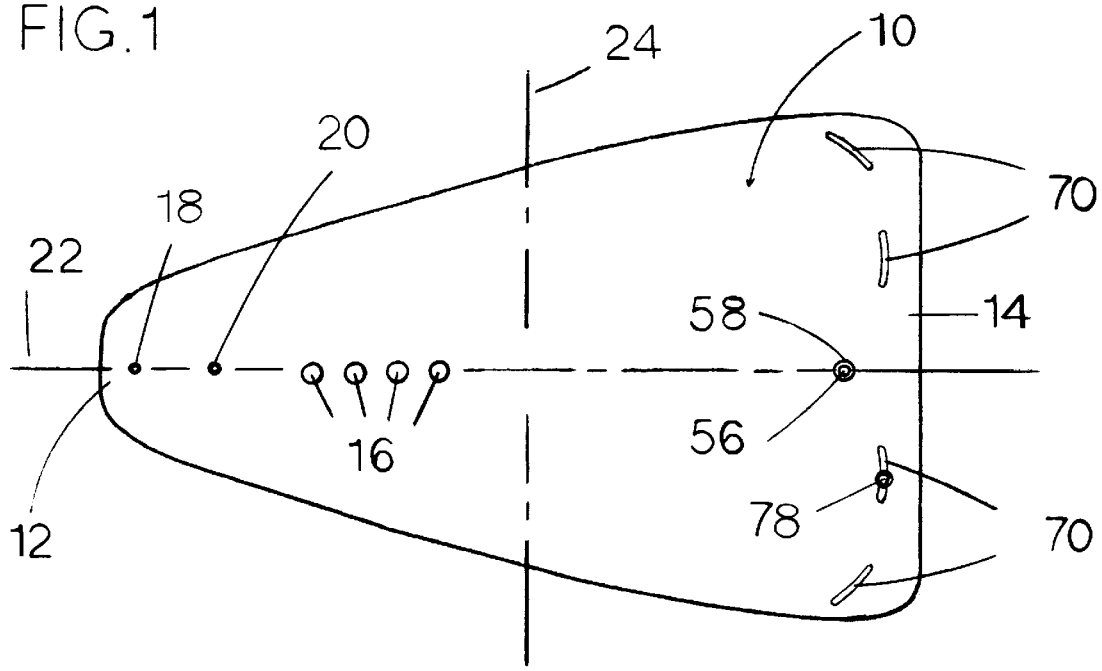
FIG. 1 is a top, plan view of the sailboard, according to an embodiment of the invention.

As shown in FIG. 1, the novel sailboard 10, comprises a board made of a plastic/foam composite, is of an arrow head shape having a leading end 12 and a trailing end 14 and is arcuately formed, both about its longitudinal axis 22, and its transverse axis 24. Approximately in the midway of its length, extending toward the leading end 12, the sailboard 10 has a plurality of apertures 16 formed therein for receiving the mast of a wind surf sail (not shown). At the leading end 12 can be seen the heads of fasteners 18 and 20 which are used in the operative coupling of a front truck assembly 26 thereunder. Too, at the trailing end 14 can be seen slots 70 and the head of one (the others are not shown) rear blade fastener 78. At the rear end 14 is also shown the head of an engageable braking pin 56 and its support spring 58.

Figure 2:
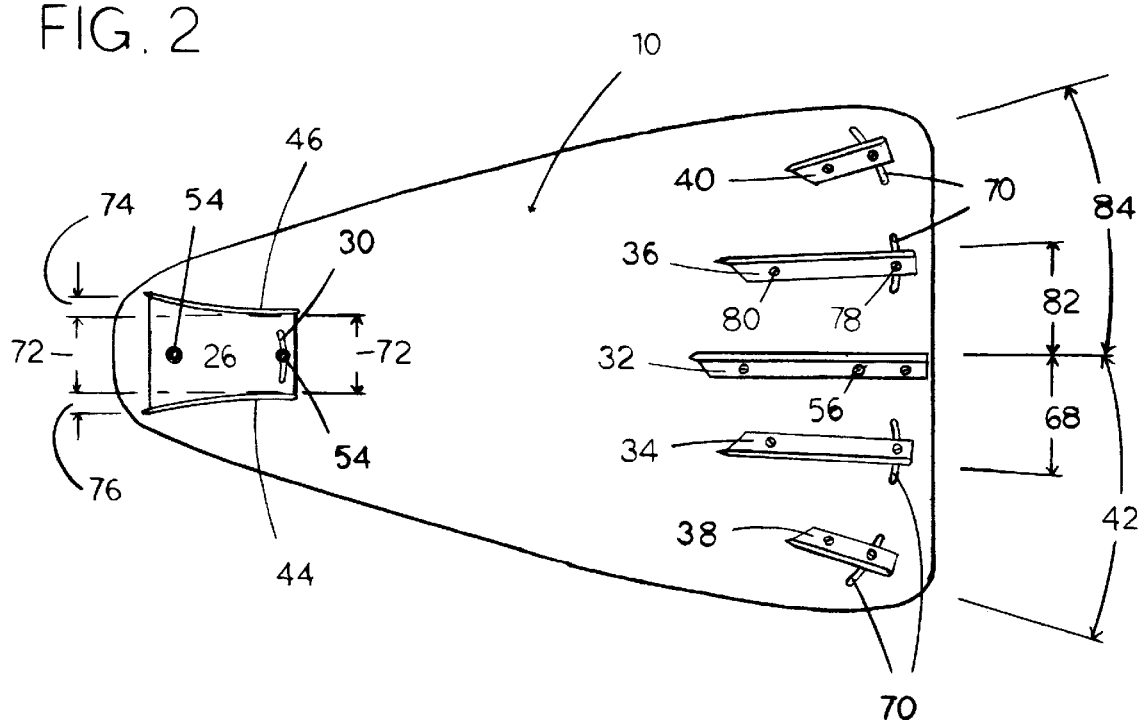
FIG. 2 is a bottom, plan view of the sailboard of FIG. 1.

FIG. 2 shows the underside of the sailboard 10 with the front truck assembly 26 in place at the front. The front truck assembly 26 will be explained in the ensuing text, however arcuate slot 30 is shown at the rear of the assembly and one of the two curved features of blades 44 and 46 are apparent. Said blades 44 and 46 are parallel at the rear of the assembly 26 as shown by 72. Blade 44 curves from the rear outward toward the front resulting in distance 76. Blade 46 is a mirror image of blade 44 and curves from the rear outward toward the front resulting in distance 74. Fastening hardware 54 is also visible.

At the trailing end 14 of the sailboard 10 are a plurality of blades 32, 34, 36, 38, and 40, held in place by fasteners 78 and 80. Blade 32 is mounted in line with longitudinal axis 22. The rear fasteners 78 of blades 34, 36, 38, and 40 ride in arcuate slots 70. The arcuate angle of blades 34, 36, 38 and 40 relative to blade 32 or axis 22 is thus adjustable. Blades 34, 36, 38, and 40 are typically arranged in juxtaposition with each other, and blade 32, as shown and represented in angles 42, 68, 82, and 84. Also shown at the trailing end or rear 14 of the sailboard 10 is the bottom of an engageable braking pin 56.

Figure 3:
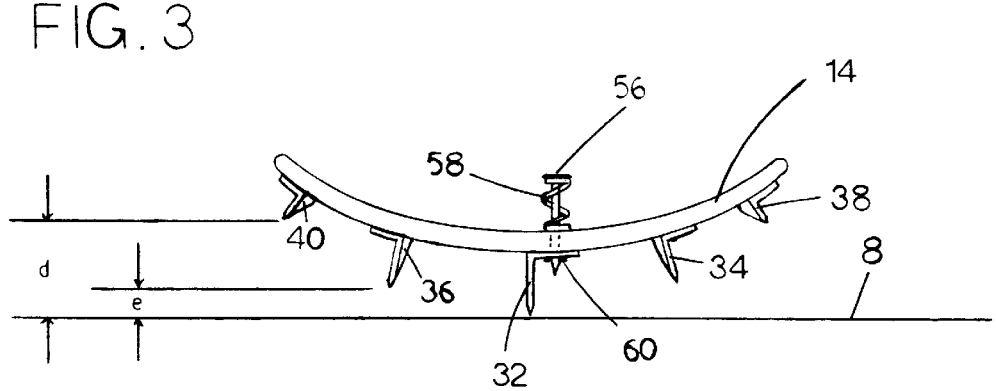
FIG. 3 is a rear, end view of the sailboard shown in relation to a bearing surface, in which, for purposes of clarity, the front truck assembly is not shown.
Figure 4:
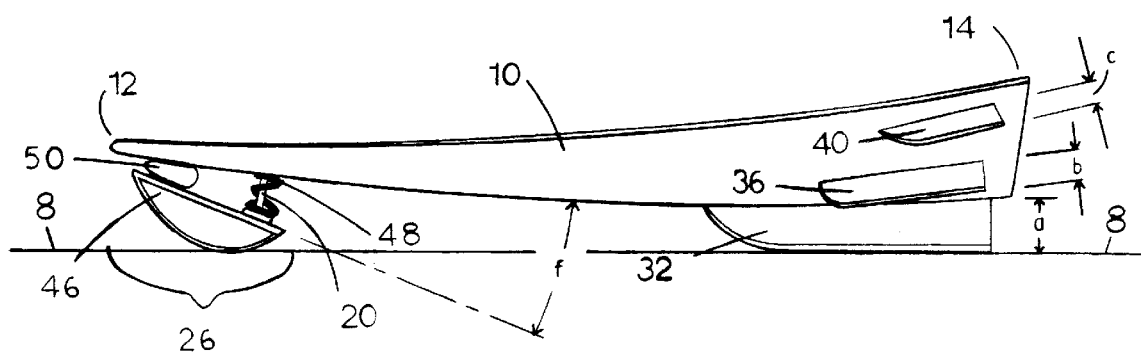
FIG. 4 is a side, elevational view of the sailboard also shown in relation to a bearing surface.

With a study of FIG. 3, looking at the rear 14 of the sailboard 10 vis-a-vis FIG. 1, it can be seen the sailboard is arcuately formed about its longitudinal axis 22. With the sailboard in an upright position this arcuate shape lifts the outer blades 34, 36, 38, and 40 from the bearing surface 8 as shown in distances "d" and "e". Shown in greater detail are the engageable braking pin 56, the spring 58 and the roll pin fastener 60 holding the pin in place. FIG. 4 shows the port side of sailboard 10 with the front truck assembly 26 shown at the leading end 12 of the sailboard 10, and blades 32, 36, and 40 are shown at the trailing end 14 of the sailboard 10. Blades 32, 34, 36, 38, and 40 as shown in FIGS. 3 and 4 are of differing extents from the sailboard, i.e., different heights. Blade 32 has a given, greatest height "a". Blades 34 and 36 have a common, greatest height "b" which is less than height "a". Blades 38 and 40 have a common greatest height "c" which is less than height "b". Only the port side is shown, the starboard side is a mirror image.

At the leading end 12 of sailboard 10, a front upper elastomeric mounting disc 50 is visible and the rear mounted spring 48 and bolt 20 are visible. Spring 48 pushes the front truck assembly 26 down at the rear forming angle "f". This, coupled with the front-to-rear curvature of blades 44 and 46 (as seen in FIG. 2) causes only the rear, parallel sections of blades 44 and 46 to contact the bearing surface 8 when the sailboard 10 is in an upright disposition.

Figure 5:
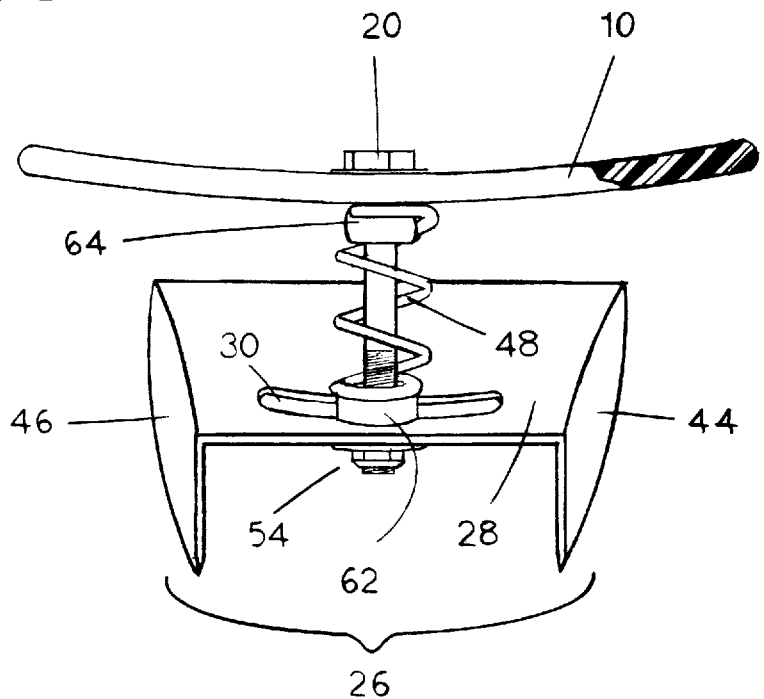
FIG. 5 is a greatly enlarged depiction of the front truck assembly, taken from the rear of the assembly.
Figure 6:
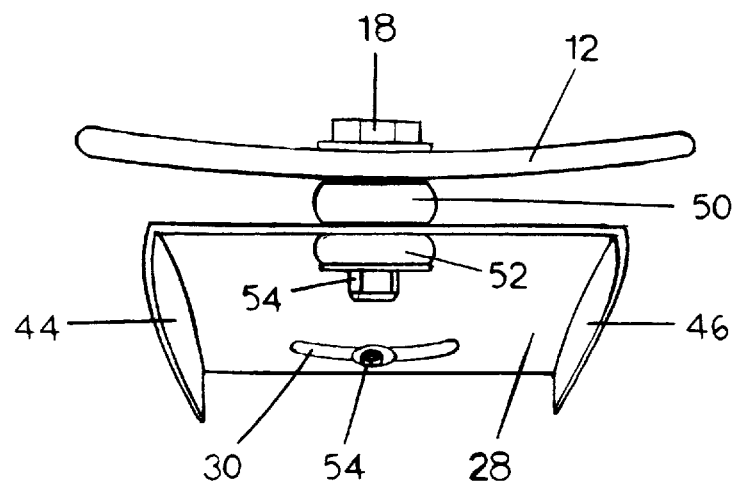
FIG. 6 is an illustration of the front truck assembly, in the scale of FIG. 5, taken from the front of the assembly.

FIGS. 5 and 6 are enlarged over the scale of FIGS. 1 through 4 so that the details of the front truck assembly 26 can be discerned with more clarity. As FIGS. 5 and 6 depict, vis-a-vis FIGS. 2 and 4 especially, the assembly 26, consists of a mounting plate 28 with the integral side blades 44 and 46. The aforesaid arcuate slot 30 is formed in the rear of the plate 28. Between sailboard 10 and the plate 28, toward the rear of the front truck assembly 26, is the compression spring 48. Spring 48 is held between sailboard 10 and mounting plate 28 through the mounting bolt 20, hardware 54, and bushing 62. Mounting bolt 20 runs through slot 30 and may be locked in the center of the slot 30, or may be free to travel in the slot 30 depending on fastening hardware 54 tension. Elastomeric damping disc 64, used to dampen compression spring 48 force, is shown on mounting bolt 20. Toward the front of the assembly, elastomeric discs 50 and 52 are provided, both held in place with bolt 18, one between the sailboard 10 and mounting plate 28, and one between mounting plate 28 and fastening nut and washer hardware 54.

Blades 32, 34, 36, 38, and 40 as seen in FIGS. 2 and 4 are typically straight for their length and height excepting for the upward curve at the front. Blades 44 and 46 as seen in FIGS. 2, 4, 5, and 6 are curved almost entirely from front to rear when looked at from the side in a height profile perspective, and outwardly from rear to front, as seen from a bottom view perspective. The curving thereof, plus the arcuate formation of the sailboard about its axes 22 and 24, the pivotable mounting 30, 48, 50, 52, and mounting angle "f" of the front truck assembly 26, and the angles 42, 68, 82 and 84 of the rear blades 34, 36, 38, 40, all contribute to the remarkable steering capability of the sailboard 10.

When a user of the novel invention mounts and stands on the sailboard and holds onto the boom of the sail (a typical wind surf sail not shown), a shifting of the weight thereupon, by moving from center to either port or starboard and forward, or vice versa, will cause the arcuate sailboard to incline and steer in either direction. If the user shifts weight to port and forward, the sailboard will incline to port, cause the front truck assembly 26 to compress at the rear, and slew to starboard at the rear, this motion causes the port blade 46 to change its contact area, and angle, and lifts the starboard blade 44 off the running or bearing surface 8. This results in the front of the port blade 46 being significantly angled out toward port, resulting in the front or leading end 12 of the sailboard 10 turning to port.

At the same time, at the rear or trailing end 14 of the sailboard 10, the arcuate angle of the longitudinal axis 22 causes the sailboard to roll from the center rear blade 32 to the outer rear blades 36, 40, on the port side lifting the starboard blades 34, 38, and the center blade 32 off the bearing surface 8. The port outer blades to which the sailboard shifts, are increasingly angled in at the front toward the longitudinal axis 22, causing the rear of the sailboard to slew to starboard. The resulting degree of turn is proportional to the amount of weight transfer and sailboard roll; as both occur, the front of the sailboard turns to port and the rear of the sailboard slews to starboard resulting in unprecedented steering control of the sailboard. If the weight is shifted to starboard the opposite effect occurs.

To slow or stop the sailboard, in addition to releasing the sail, one steps on the engageable braking pin 56 which in turn drags on, or digs in to, the running or bearing surface 8.

While I have described my invention, in connection with a specific embodiment thereof, it is to be clearly understood that this is done only by way of example and not as a limitation of the invention as set forth in the objects thereof, and in the appended claims. As disclosed, the sailboard is supportable upon frozen surfaces by blading. Clearly the same invention can be practiced with a sailboard supportable on paved surfaces by rollers.

I claim:

1. A sailboard, for a wind powered, sailing apparatus, comprising:

a board; and means, coupled to said board, for supporting said board, in elevation, upon a bearing surface; wherein said board has a longitudinal axis;

said board is arcuately formed about said longitudinal axis;

said board supporting means comprises blades;

a first plurality of said blades are parallel with said longitudinal axis; and a second plurality of said blades are angularly disposed relative to said longitudinal axis;

said board has a leading end, and a trailing end;

one of said ends has at least one blade parallel with said longitudinal axis;

said first plurality of said blades are disposed at a slight angle relative to said longitudinal axis; and said second plurality of said blades are disposed at a greater angle to said longitudinal axis than said slight angle.

2. A sailboard, according to claim 1, wherein;

said leading end has at least one blade pivotably coupled thereto.

3. A sailboard, for a wind powered, sailing apparatus, comprising:

a board; and means, coupled to said board, for supporting said board, in elevation, upon a bearing surface; wherein said board has a longitudinal axis;

said board is arcuately formed about said longitudinal axis;

said supporting means comprises a dual blade truck assembly pivotably coupled to said board;

said truck assembly comprises a plate, and a pair of depending blades integral with said plate;

each of said blades is arcuately curved lengthwise and widthwise thereof; and each of said blades is a mirror image of the other thereof.

4. A sailboard, for a wind powered, sailing apparatus, comprising:

a board; and means, coupled to said board, for supporting said board, in elevation, upon a bearing surface; wherein said board has a longitudinal axis;

said board is arcuately formed about said longitudinal axis;

said supporting means comprises a dual blade truck assembly pivotably coupled to said board;

said truck assembly comprises a plate, and a pair of depending blades integral with said plate;

each of said blades is arcuately curved lengthwise thereof and widthwise thereof;

each of said blades is a mirror image of the other thereof;

said plate has a spring means interposed between it and said board; and means interposed between said plate and said board for damping shock forces.

5. A sailboard, for a wind powered, sailing apparatus, comprising:

a board; and means, coupled to said board, for supporting said board, in elevation, upon a bearing surface; wherein said board has a longitudinal axis;

said board is arcuately formed about said longitudinal axis;

said board supporting means comprises a plurality of spaced apart blades;

said plurality of blades comprises a first blade in direct alignment with said longitudinal axis, and second and third blades astride, and spaced apart from said first blade;

fourth and fifth blades, astride said second and third blades, and spaced apart from said second and third blades;

said first blade has a given, greatest height;

said second and third blades each have a given greatest height which is less than said height of said first blade; and said fourth and fifth blades each have a given greatest height which is less than said height of said second and third blades.

6. A sailboard, for a wind powered, sailing apparatus, comprising:

a board; and means, coupled to said board, for supporting said board, in elevation, upon a bearing surface; wherein said board has a longitudinal axis;

said board is arcuately formed about said longitudinal axis;

said board supporting means comprises blades;

a first plurality of said blades are parallel with said longitudinal axis;

a second plurality of said blades are angularly disposed relative to said longitudinal axis;

said first plurality of blades comprises second and third blades juxtapositioned with a first blade;

said second plurality of blades comprises a fourth blade juxtapositioned with said second blade, and a fifth blade juxtapositioned with with said third blade; and said second, third, fourth, and fifth blades define acute angles therebetween, and relative to said longitudinal axis.

7. A sailboard according to claim 6 further including:

means for adjusting said second, third, fourth and fifth blades' juxtapositioning and acute angles relative to said longitudinal axis.

8. A sailboard, according to claim 6, further including:

a retractable component (a) carried by said board and (b), engageable with a bearing surface.

* * * * *